Patented Sept. 16, 1952

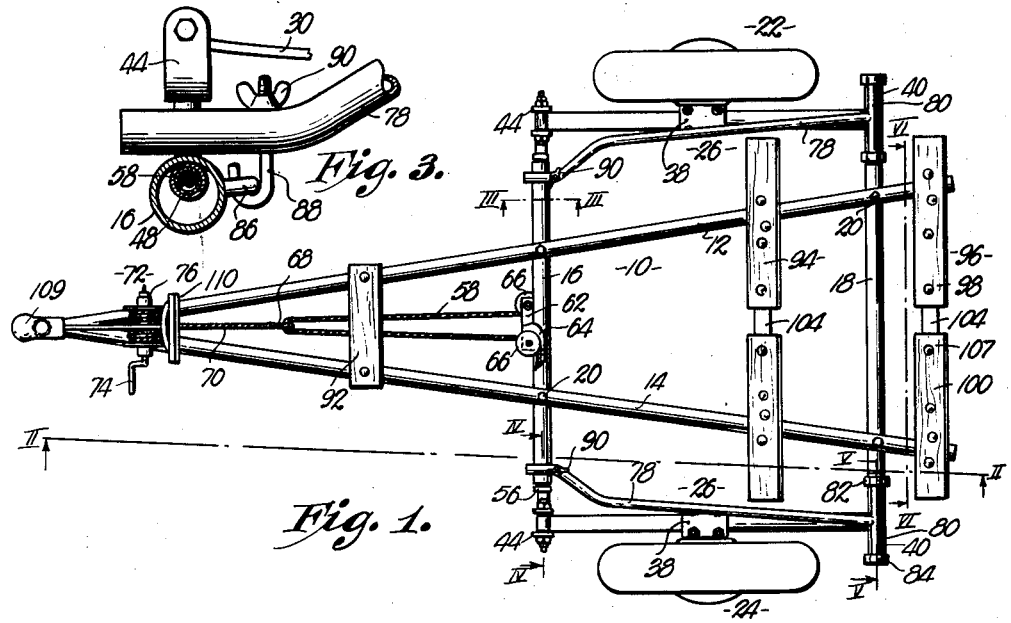
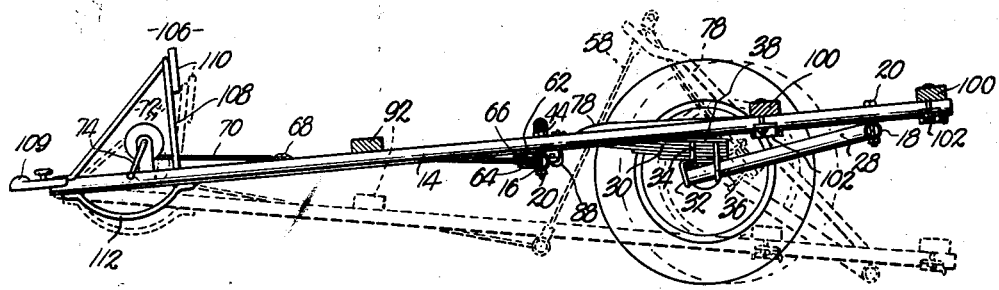
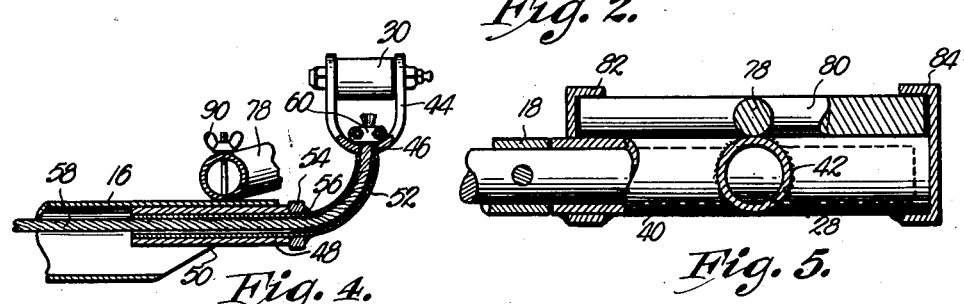
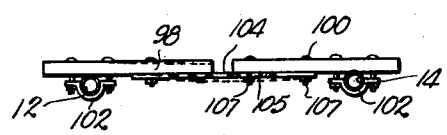
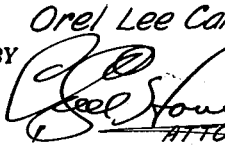

2,610,865

UNITED STATES PATENT OFFICE 2,610,865

TRAILER FOR BOATS AND THE LIKE

Orel Lee Cantrell, Topeka, Kans.

Application June 1, 1948, Serial No. 30,470

2 Claims. (Cl. 280—44)

This invention relates to mobile structures in the form of a trailer and particularly of the kind having a load-supporting frame mounted on wheel and axle assemblies and shiftable with respect to such assemblies toward and away from the surface of the ground or other supporting means for the trailer itself.

It is well known by sportsman and others generally that transportation of boats and the like to and from a body of water is a difficult task. Oftentimes, small boats are carried on top of an automobile and many different types of trailers have been provided for carrying such boats.

The lifting of the boat in and out of the water, positioning the same upon such trailers or upon the top of the automobile is a difficult task and, therefore, it is the most important object of this invention to provide a trailer rendering this operation simple and easy.

Another object of this invention is to provide a trailer for boats and the like having a pair of spaced-apart opposed wheel and axle assemblies, the assemblies each being provided with an elongated arm secured directly thereto, swingable to and from a position rendering a load-supporting frame carried by the arms shiftable vertically to and from a position substantially level with the ground.

Another important object of this invention is to provide a trailer having means for attachment to an automobile or other motivating means and having a load-supporting frame disposed between a pair of wheel and axle assemblies and pivotally mounted to a pair of arms swingably secured to the axles of the assemblies, whereby, upon swinging movement of the arms, the frame is moved as a unit toward and from a position adjacent and above the axis of rotation of the wheels.

Other objects of this invention include the way in which the aforesaid swingable arms are provided in part with springs to cushion the load; the manner in which one end of the arms is pivotally connected to the frame, whereas, the opposite ends thereof are joined by extensible means to the frame; the way in which cables, pulleys and a winch are provided for swinging the arms to and from a position permitting lowering of the frame for receiving the boat or the like and the manner in which the frame itself is provided with portions that are shiftable to and from a position substantially conformable to a portion of the lowermost edge of the boat itself.

Many additional objects pertaining to details of construction will be made clear or become apparent as the following specification progresses, reference being had to the accompanying drawing, wherein:

Fig. 1 is a top plan view of a trailer for boats and the like made in accordance with the present invention.

Fig. 2 is a longitudinal cross sectional view, taken on line II—II of Fig. 1, showing the parts of the trailer in two of its possible positions.

Fig. 3 is a fragmentary enlarged cross sectional view taken on line III—III of Fig. 1.

Fig. 4 is a fragmentary cross sectional view taken on line IV—IV of Fig. 1.

Fig. 5 is an enlarged fragmentary cross sectional view taken on line V—V of Fig. 1; and Fig. 6 is a cross sectional view taken on line VI—VI of Fig. 1, looking in the direction of the arrows.

In the drawing, a frame broadly designated by the numeral 10 includes a pair of elongated preferably tubular members 12 and 14 that converge as one end thereof is approached, said one end of the members 12 and 14 being joined together in any suitable manner (not shown).

Frame 10, also, has a pair of spaced tubular cross-arms 16 and 18 underlying the members 12 and 14 and suitably joined thereto by welding or by bolts 20, as indicated in Figs. 1 and 2. As clearly indicated in Fig. 1, the ends of these crossarms 16 and 18 extend outwardly beyond the two beams 12 and 14 and are of substantially the same length.

The entire frame 10 is disposed between a pair of wheel and axle assemblies 22 and 24 respectively. These assemblies 22 and 24 are each provided with a stub axle (not shown) of conventional character, said axles each having secured thereto an elongated member broadly designated by the numeral 26. These two members 26 are of identical character and, therefore, only one will be described.

A rod 28 forms a part of the members 26 and extends rearwardly from the respective stub axle of assembly 22 or 24, as the case may be, and is substantially perpendicular to the longitudinal axes of crossarms 16 and 18. Members 26, also, include an elliptical spring structure 30 that extends forwardly from the respective stub axle as indicated in Figs. 1 and 2.

This spring structure 30 is of the usual type, constituting a number of flat, superimposed plates disposed in stepped fashion and the innermost proximal ends of the structure 30 and rod 28 are joined together and directly to the respective stub axle. It is contemplated that rod 28 be welded directly to the innermost end of the stub axle and have a substantially L-shaped bracket 32 secured upon its innermost end and overlapping a portion of the uppermost face thereof.

A U-shaped clamp 34 joins the spring member 30 to this bracket 32, whereas, a second U-shaped clamp 36 connects the rod 28 directly to the member 30. A plate 38 overlying the spring member 30 receives the free ends of the two U-shaped coupling devices 34 and 36.

It is thus seen, as illustrated in Fig. 2, that the bracket 32 serves in joining the spring member 30 to the rod 28 at an angle thereto. In other words, member 30 and the rod 28 extend upwardly in opposite directions from the axis of rotation of the wheel assemblies 22 or 24.

As shown in Fig. 5, a tubular bearing 40 is telescoped on the outermost free ends respectively of the member 18. The outermost free end of the rod 28 is welded as at 42 directly to this sleeve-like bearing 40. The outermost free end of the spring member 30 is provided with a depending U-shaped shackle 44 pivotally mounted to the respective spring member 30 and provided with an opening 46 at the bight thereof.

The cross member 16 has a tubular bearing 48 telescoped therein and extending beyond the proximal ends of member 16, said tube 48 being secured directly to the cross member 16 as by welding 50.

An arcuate pipe 52 extends into the tube 48 and is freely rotatable therein. This pipe 52 has an out-turned flange 54 welded thereon as at 56 and normally bearing against the outermost free end of the tube 48.

A cable 58 has the ends thereof passing through the openings 46 of each of the shackles 44, said ends being secured within the shackles 44 by means of a clamp 60. From the clamps 60, this cable passes downwardly through openings 46, is threaded through the pipe 52 and then passes inwardly toward the center of cross member 16.

This cross member 16 is provided with a slot at the forward edge thereof for receiving a pair of spaced-apart plates 62 and 64, having disposed therebetween a pair of spaced pulleys 66. The two ends of the cable 58 pass over these pulleys 66 and thence forwardly from the cross member 16.

A loop 68 is formed in one end of a second cable 70 for threadably receiving the bight of the cable 58. Cable 70 extends forwardly from the cable 58 and is wound about the drum of a winch 72 that is secured directly to the members 12 and 14 of frame 10. This winch 72 is located adjacent the connected ends of members 12 and 14 and is provided with a manually manipulable crank 74 in the usual manner. A locking means 76 of conventional character releasably holds the drum of winch 72 against rotation.

A pair of T-shaped arms 78 overlie the members 26. These arms 78 are joined directly to the sleeve-like bearing 40 by having one leg 80 thereof resting upon such sleeve 40 and journalled for free rotation with respect to the sleeve 40 by means of a pair of spaced bearings 82 and 84 secured directly to bearing 40.

The stem portion of the arms 78 extends forwardly from the sleeve 40 and the cross arm 18 across the member 26 and in overlying relationship at the free end thereof with the cross arm 16. As shown in Fig. 3, a loop 86 secured directly to the cross member 16 receives a hook 88 mounted upon the arm 78 adjacent the outermost free end thereof.

A wing nut or the like 90 serves to releasably hold the hook member 88 in place, whereby the latter may be released from loop 86.

Supporting means is provided on the elongated members 12 and 14 of frame 10, including the cross plate 92 connecting members 12 and 14 between the normally forward ends thereof and the cross member 16 and a pair of cross panels 94 and 96 adjacent the rearmost end of the frame 10. These cross members 94 and 96 are formed as shown in Fig. 6 of the drawing and include a pair of plates 98 and 100 joined to the respective members 12 and 14 by means of bearings 102. Thus, each of the members 98 and 100 is free to rotate on the member 12 or 14, as the case may be.

The two sections 98 and 100 are joined together by means of a plate 104 of resilient material. Plates 104 each have elongated, longitudinal slots 105 to slidably receive mounting bolts 107. A front end bumper 106 for the boat includes an upstanding bracket 108 and a plate 110 preferably formed from resilient material holding the boat or other load against the forward movement upon the frame 10 and, also, serves to protect the winch 72 against damage by the boat.

A conventional coupling means 109 secured to the joined ends of the members 12 and 14 serves to connect the trailer to a suitable hitch upon an automobile or the like. An arcuate skid 112 secured to the members 12 and 14 immediately below the winch 72 and bumper 106 limits the extent of downward movement of the frame 10. Assuming the component parts of the trailer to be formed as above described, the operation is as follows:

Frame 10 is normally in a substantially horizontal position when the coupling 109 is connected to the automobile hitch, all as shown in full lines in Fig. 2 of the drawing. When it is desired to lower frame 10 to a position adjacent the supporting surface of assemblies 22 and 24, the operator releases the lock 76 permitting rotation of the drum of winch 72.

As the end 68 of cable 70 moves rearwardly with respect to the frame 10, the members 26 will be free to swing to the position shown by dotted lines in Fig. 2. The cable 58 moves through the member 16 and the arcuate pipe 52 permitting separation of such pipe 52 and the shackle 44.

Thus, the cross member 16 together with the two curved rods 52 thereof move downwardly as the outermost free ends of the spring members 30 and their shackles 44 swing upwardly, as shown in Fig. 2.

Because of the pivotal connection between the two spaced-apart rods 28 and the cross member 18, by virtue of the rotatable sleeve 40, the cross member 18 and, also, its associated parts move downwardly as shown in Fig. 2. It is to be understood that the operation is possible whether the trailer is connected to the automobile or is disconnected and lower to a position where the skid 112 rests upon the ground.

This operation, of course, is possible only when the arms 78 are released from the cross member 16. This is accomplished by disconnecting the hooks 88 and loops 86, permitting separation of arms 78 and the cross member 16, as shown in Fig. 2.

When the trailer is in the raised, operative position, the load carried thereby is cushioned by virtue of the springs 30 and the arms 78 serve as a safety feature in the event that winch 72 should loosen or the cables 70 or 58 break during transportation of such load.

Since the trailer is designed particularly for use to carry a boat, the lowermost edge of such boat will rest directly upon the cross members 92, 94 and 96. Inasmuch as the parts 98 and 100 of cross members 94 and 96 are swingably secured to the respective members 12 and 14, the weight of the boat will cause such sections 98 and 100 to swing downwardly because of spring 104, whereby these sections 98 and 100 conform to the contour of a portion of the boat. If necessary, the boat may be tied in any manner to the frame 10, as by securement to the upstanding bumper 106.

Through use of the trailer forming the subject matter of this invention, it is possible to disconnect the same from an automobile or the like and to move the entire trailer to the water edge or into the water itself, whereby the boat may be floated into position over the trailer after the frame 10 thereof has been lowered below the axis of rotation of assemblies 22 and 24.

After the boat has so been floated into place, the frame 10 together with the boat may be raised by manipulation of winch 72.

While the trailer has been designed particularly for boats, it is manifest that the broad principles hereof might well be used for other trailers where heavy loads can be moved thereon much easier and simpler by lowering the load-supporting frame of the trailer to the level of the ground.

Accordingly, it is desired to be limited by the spirit of this invention as defined by the scope of the appended claims.

Having thus described my invention, what I claim as new and desire to secure by Letters Patent is:

1. A trailer comprising a pair of ground-engaging wheels, each provided with an axle; a leaf spring secured to each axle respectively and extending radially therefrom in one direction; a rod on each axle respectively and extending radially therefrom in the opposite direction; a frame between the wheels, having a first cross arm pivotally secured to said rods and a second cross arm spaced from the first cross arm; a cable carried by the second cross arm and attached to said leaf springs; and means on the frame attached to said cable for holding the leaf springs against swinging movement away from the second cross arm.

2. A trailer comprising a pair of ground-engaging wheels, each provided with an axle; a leaf spring secured to each axle respectively and extending radially therefrom in one direction; a rod on each axle respectively and extending radially therefrom in the opposite direction; a frame between the wheels, having a first cross arm pivotally secured to said rods and a second cross arm spaced from the first cross arm; a cable carried by the second cross arm and attached to said leaf springs; means on the frame attached to said cable for holding the leaf springs against swinging movement away from the second cross arm; and locking means including a member pivotally connected to one of said cross bars, and releasable means for connecting the member to the other of said cross bars.

OREL LEE CANTRELL.

REFERENCES CITED

The following references are of record in the file of this patent:

UNITED STATES PATENTS

| Number | Name | Date |
| --- | --- | --- |
| 1,745,881 | Wood | Feb. 4, 1930 |
| 2,227,762 | Ronning | Jan. 7, 1941 |
| 2,442,071 | Bunten | May 25, 1948 |
| 2,453,388 | Schramm | Nov. 9, 1948 |
| 2,466,102 | Heldenbrand | Apr. 5, 1949 |
| 2,478,795 | Whalen et al. | Aug. 9, 1949 |
| 2,513,855 | Fogwell | July 4, 1950 |

FOREIGN PATENTS

| Number | Country | Date |
| --- | --- | --- |
| 766,917 | France | Apr. 23, 1934 |